US011023469B2

(12) United States Patent
Ramesh et al.

(10) Patent No.: US 11,023,469 B2
(45) Date of Patent: Jun. 1, 2021

(54) VALUE LIST COMPRESSION (VLC) AWARE QUALIFICATION

(71) Applicant: Teradata US, Inc., Dayton, OH (US)

(72) Inventors: Bhashyam Ramesh, Secunderabad (IN); Tirupathi Prabhu Bellapukonda, Hyderabad (IN); Philip Jason Benton, San Diego, CA (US); Donald Raymond Pederson, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 486 days.

(21) Appl. No.: 15/825,175

(22) Filed: Nov. 29, 2017

(65) Prior Publication Data
US 2019/0163788 A1 May 30, 2019

(51) Int. Cl.
*G06F 16/30* (2019.01)
*G06F 16/2455* (2019.01)
*G06F 16/22* (2019.01)

(52) U.S. Cl.
CPC ...... *G06F 16/24561* (2019.01); *G06F 16/221* (2019.01); *G06F 16/2237* (2019.01); *G06F 16/2282* (2019.01)

(58) Field of Classification Search
CPC .......... G06F 16/24561; G06F 16/2237; G06F 16/2282; G06F 16/221
USPC ...................................................... 707/693
See application file for complete search history.

(56) References Cited

U.S. PATENT DOCUMENTS

| | | | |
|---|---|---|---|
| 2010/0161650 A1* | 6/2010 | Chaitanya | G06F 16/24552 707/769 |
| 2012/0054225 A1* | 3/2012 | Marwah | G06F 16/2453 707/769 |
| 2013/0060780 A1 | 3/2013 | Lahiri et al. | |
| 2015/0178305 A1 | 6/2015 | Mueller et al. | |
| 2015/0186434 A1* | 7/2015 | Eichinger | G06F 16/1744 707/693 |
| 2015/0286683 A1* | 10/2015 | Zhou | G06F 16/2456 707/693 |
| 2015/0379056 A1* | 12/2015 | Bolik | G06F 16/221 707/693 |
| 2016/0085834 A1* | 3/2016 | Gleeson | G06F 16/2282 707/693 |
| 2017/0004157 A1 | 1/2017 | Varadarajan et al. | |
| 2017/0139947 A1 | 5/2017 | Abed et al. | |
| 2018/0075105 A1* | 3/2018 | Chavan | G06F 16/24537 |

* cited by examiner

*Primary Examiner* — Kuen S Lu

(57) ABSTRACT

A database includes a Value List Compression (VLC) predicate evaluator. A table identified in a query that is being processed is identified as having compressed data values. The predicate evaluator compares a query predicate of the query against actual decompressed values noted in a dictionary for the table and the predicate evaluator maintains a bitmap for selective ones of the actual values that satisfy the query predicate. The matched bitmap positions are processed against an index maintained in the table for the actual values to provide selective decompressed table entries as results for the query.

19 Claims, 4 Drawing Sheets

VALUE LIST COMPRESSION (VLC) AWARE QUALIFICATION

BACKGROUND

Large databases or data warehouses often employ a variety of techniques for minimizing the size of the stored data and for providing more processor/memory efficient response times to queries issued against the databases.

For example, for columnar tables, the container rows are compressed by one or more compression techniques. One of the compression techniques is called Value List Compression (VLC). The values stored in the tables are numbers and those numbers map to dictionaries where the actual values are stored. This reduces the size of the tables within the database. The database engine operates on multiple rows for predicate evaluation in retrieval and join operations for query processing; this technique is referred to as bulk qualification.

Bulk qualification enables reading and evaluating column partition values in a set-oriented manner. A column partition (CP) scanner reads a bunch of values by decompressing the values (if the values are in fact compressed) from the dictionaries and processes the decompressed values for query processing. Qualified rows are built for output before processing a next bunch of values from table. This process continues until there are no longer any more rows in the table that require evaluation for the query.

The problem with this approach is that decompression of data values for the predicate columns before doing actual comparisons results in high processor usage for the computer(s) of the database.

SUMMARY

VLC aware qualification is presented.

In an embodiment, a method for VLC aware qualification is provided. A predicate evaluator compares a query predicate of a query against actual decompressed values noted in a dictionary for a table and the predicate evaluator maintains a bitmap for selective ones of the actual values that satisfy the query predicate. The matched bitmap positions are processed against an index maintained in the table for the actual values to provide selective decompressed table entries as results for the query.

DETAILED DESCRIPTION

Various embodiments depicted herein are implemented as one or more software modules, which are programmed within memory and/or non-transitory computer-readable storage media and executed on one or more processing devices (having memory, storage, network connections, one or more processors, etc.).

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse").

As presented herein and below, a more processor efficient approach to query processing by evaluating a value list for compressed values and value list plus run length compressed columns without decompressing the data. The techniques process against columnar tables when the columns of the tables are compressed using container VLC or container VLC plus run length and table header VLC with container VLC compression or VLC plus run length.

As used here, "actual values" refer to data values that are decompressed (not compressed). The actual values are stored in a variety of data dictionaries. A table header dictionary is stored in a table header of a table when VLC is defined at the table level of detail. A static dictionary and dynamic dictionary are stored in a container row of a table when rows of the table are compressed through VLC.

A "container row" includes specific row header information, a VLC compression dictionary, and column values for a column partitioned table.

As used herein, "qualified value" is intended to mean that during evaluation of predicates in a query a match to one or more actual values in the dictionaries was found that satisfies at least a portion of the query.

The techniques presented herein for VLC aware qualification can be used for all data types available in the database/warehouse. Furthermore, the VLC aware qualification can process for all relational search operators.

Figure 1:
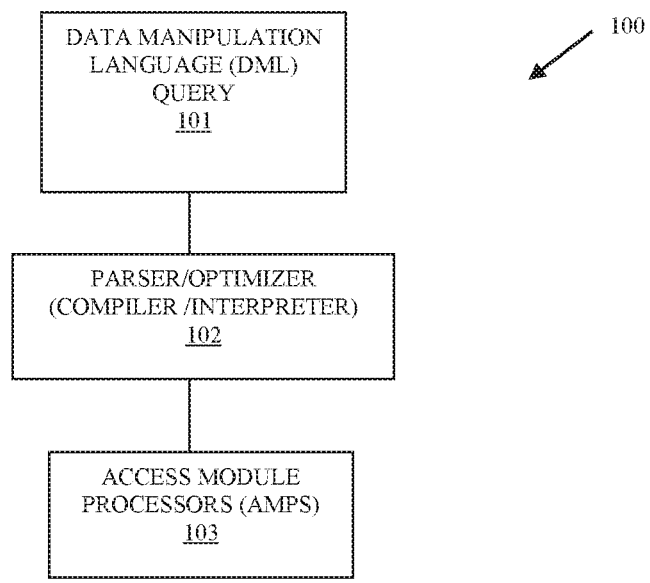
FIG. 1 is a diagram of a system for performing VLC aware qualification processing, according to an embodiment.

FIG. 1 is a diagram of a system 100 for performing VLC aware qualification processing, according to an embodiment.

The system 100 is shown in greatly simplified form with just those components necessary for comprehension of embodiments of the invention presented. It is to be understood that additional components or subcomponents may be used without departing from the teachings presented herein.

The system 100 includes a Data Manipulation Language (DML) (such as Structured Query Language (SQL)) query 101 (herein after just "query 101," a parser/optimizer (compiler/interpreter) 102 (herein after just "optimizer 102"), and Access Module Processors (AMPs—that execute instructions against the database).

The query 101 can be issued and/or originate from an automated process (application or script) within the warehouse (such as through schedule reports, etc.) of can be issued and/or originate from an end-user (such as a Database Administrator (DBA) or Data Analyst) through a user-interface to the warehouse.

The optimizer 102 translates or interrupts the query 101 into a set of optimal instructions that the AMPs process against the warehouse.

The AMPS 103 are essentially the warehouse engine (database engine) that process the instructions provided by the optimizer 102 on one or more physical nodes (computing devices with processors, memory, storage) of a network for the warehouse.

A new evaluation operator/process is introduced for processing by the AMPs 103 for performing the VLC aware qualification discussed herein. This is transparent to the end-user.

The new evaluation process returns a bunch of values for a column of a table that needs evaluated for the query 101 and performs compressed aware bulk evaluation against compressed columns of the table.

The evaluation process is triggered by a given predicate included in the query 101 against entries of each table header dictionary, container row static dictionary, and dynamic dictionary. If an entry for an actual value in a dictionary evaluates to true, the index position in a bitmap for the actual values in the dictionary is set; otherwise the index positions in the bitmap are unset. A compare bitmap is generated from this processing where each bit in the compare bitmap indicates whether the corresponding dictionary entry's actual data value is a qualified value or not a qualified value.

The evaluation process performs the same processing for actual values in the column for the table associated with the query. Instead of decompressing the value only the index bits are read. The index is used to check the corresponding bit in the compare bitmap; if the bit is set in the compare bitmap the respective bit is set in a result bit vector; if the bit is not set, then that bit indicates the actual comparison failed the result bit is set to 0 (zero of false).

If the container row is VLC compressed, the evaluation performs the same compare bit evaluation to finish building the result bit vector; if the container row is not VLC compressed then the existing uncompressed comparison is performed by the AMPs 103.

The results vector is then processed to locate the actual values from the dictionaries and the actual values are returned as the result of the query 101.

As an example scenario, consider a query 101 having given predicate of "x>100 and x<200." The dictionary values and the generated compare bitmap appears as follows:

| Dictionary Values | −20000 | 101 | 4 | −20 | −10 | −5 | 199 |
|---|---|---|---|---|---|---|---|
| Compare Bitmap | 0 | 1 | 0 | 0 | 0 | 0 | 1 |

The AMP 103 obtains the predicate and table from the optimizer 102, the predicate provided in the query 101. The evaluation process scans the table header dictionary for each dictionary value and checks to see whether the value is greater than 100 and less than 200. If the predicate evaluated against the dictionary values return true, then the corresponding bitmap position for the dictionary value is set ("1") otherwise the bitmap position is unset ("0").

This process is repeated with any container row static dictionary by extending the compare bitmap to represent the container row static dictionary values. The compare bitmap is extended for as many entries that are in the static dictionary.

The process is also repeated for any container row dynamic dictionary if one exists. Should the container row be natively uncompressed, the existing AMP 103 predicate evaluation is performed.

The resulting bitmap can be processed as a result vector for the actual values obtained from the dictionaries and returned as results for the query. When a bitmap position is set, the position corresponds to an actual value in one of the dictionaries.

One now appreciates how predicate evaluation can be achieved on compressed data values of tables and rows of a table without decompressing all entries in the table. This provides improved processing throughput on the processor (using the compare bitmap and results vector) and reduces memory usage (because entries in the table are not decompressed before predicate evaluation and are only decompressed to provide the results for the query 101).

The processing is VLC aware because predicate evaluation is done for all compressed table values and should there be some portions of the table that are uncompressed (natively) existing AMP-based predicate processing is used for those portions.

It is to be noted that the processing described herein can also be processed for: more than 2 levels of data compression, and/or other systems where two-dictionary based compression schemes are combined over a single database.

These and other embodiments are now discussed with reference to the FIGS. 2-4.

Figure 2:
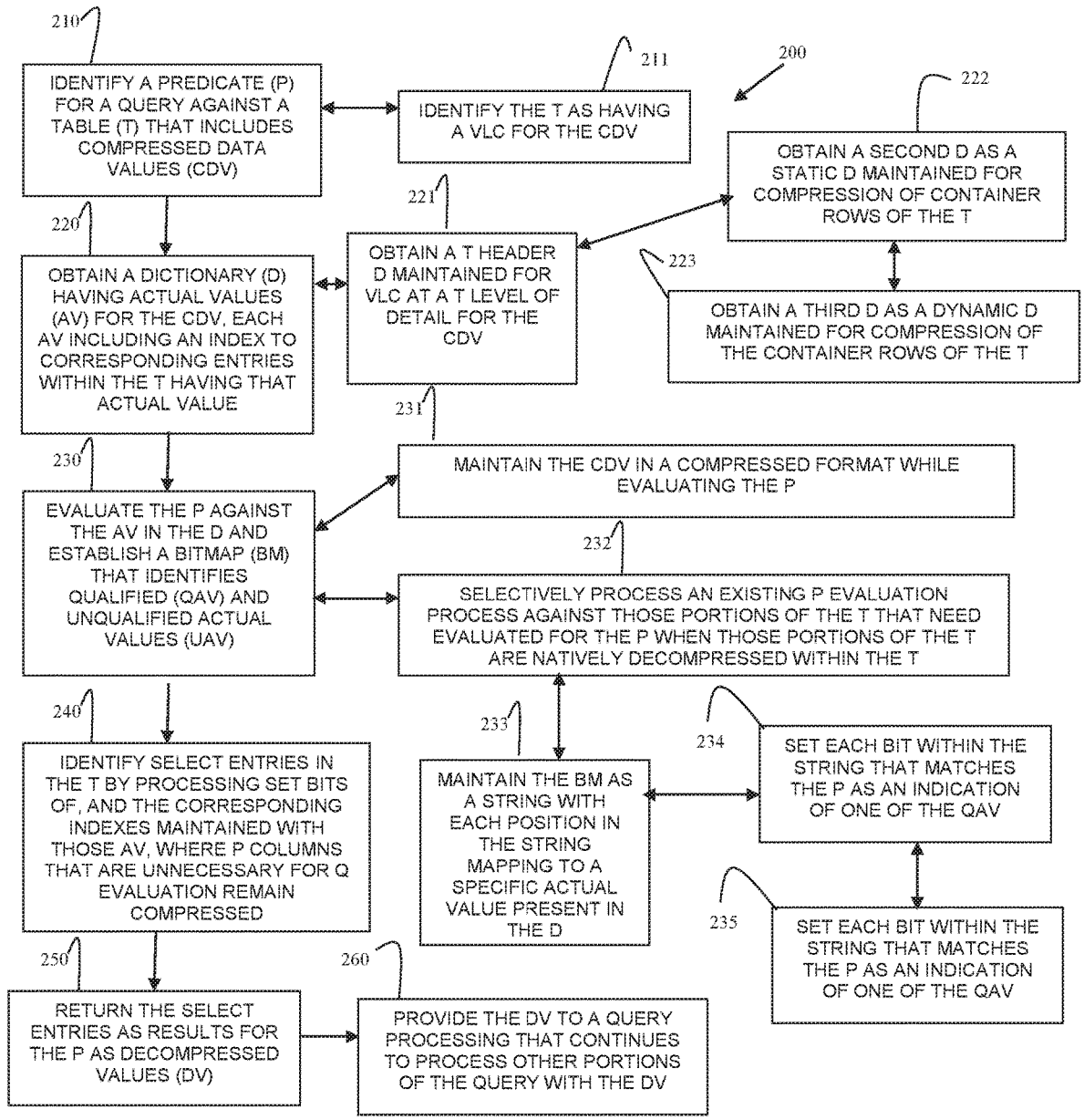
FIG. 2 is a diagram of a method for VLC aware qualification processing, according to an example embodiment.

FIG. 2 is a diagram of a method 200 for VLC aware qualification processing, according to an example embodiment. The method 200 is implemented as one or more software modules referred to as "compression predicate evaluator"). The compression predicate evaluator is executable instructions that are programmed within memory or a non-transitory computer-readable medium and executed by one or more hardware processors. The compression predicate evaluator has access to one or more network connections during processing, which can be wired, wireless, or a combination of wired and wireless.

In an embodiment, the compression predicate evaluator is implemented within a data warehouse across one or more physical devices or nodes (computing devices) for execution over a network connection.

In an embodiment, the compression predicate evaluator is all or some combination of the processing discussed for the optimizer 102 and/or the AMPs 103.

At 210, the compression predicate evaluator identifies a predicate for a query against a table. The table includes at least some compressed data values.

According to an embodiment, at 211, the compression predicate evaluator identifies the table as having VLC for the compressed data values.

At 220, the compression predicate evaluator obtains a dictionary having actual values for the compressed data values. Each actual value includes an index to corresponding entries within the table having that actual value. That is, the dictionary includes a single unique value represented as compressed values in the table along with an index for each unique value that identifies the location of that unique value in the dictionary.

In an embodiment, at 221, the compression predicate evaluator obtains table header dictionary maintained for the VLC at a table level of detail for the compressed data values.

In an embodiment of 221 and at 222, the compression predicate evaluator obtains a second dictionary as a static dictionary maintained for compression of container rows of the table.

In an embodiment of 222 and at 223, the compression predicate evaluator obtains a third dictionary as a dynamic dictionary maintained for compression of the container rows of the table.

At 230, the compression predicate evaluator evaluates the predicate against the actual values in the dictionary and establishes a bitmap that identifies qualified and unqualified actual values.

In an embodiment, at 231, the compression predicate evaluator maintains the compressed data values in a compressed format while evaluating the predicate.

In an embodiment, at 232, the compression predicate evaluator selectively processed an existing predicate evaluation process against those portions of the table that still need evaluated for the predicate when those portions of the table are natively decompressed within the table.

In an embodiment of 232 and at 233, the compression predicate evaluator maintains the bitmap as a string with each position of the string mapping to a specific actual value present in the dictionary.

In an embodiment of 233 and at 234, the compression predicate evaluator sets each bit within the string that matches the predicate as an indication of one of the qualified actual values as the index to that value.

At 240, the compression predicate evaluator identifies select entries in the table by processing the set bits of the bitmap, and the corresponding indexes maintained with those actual values. In essence, the compression evaluator evaluates each index value in a column instead of the actual value. Also, predicate columns that are unnecessary for query evaluation are never decompressed and remain in a compressed format within the table.

According to an embodiment, at 250, the compression predicate evaluator returns the select entries as results for the predicate as decompressed values.

In an embodiment of 250 and at 260, the compression predicate evaluator provides the decompressed data values to a query process that continues to process other portions of the query with the decompressed values.

In it to be noted, that the given predicate for VLC aware qualification can be complex and is not restricted in any manner for the operation of the compression predicate evaluator.

Figure 3:
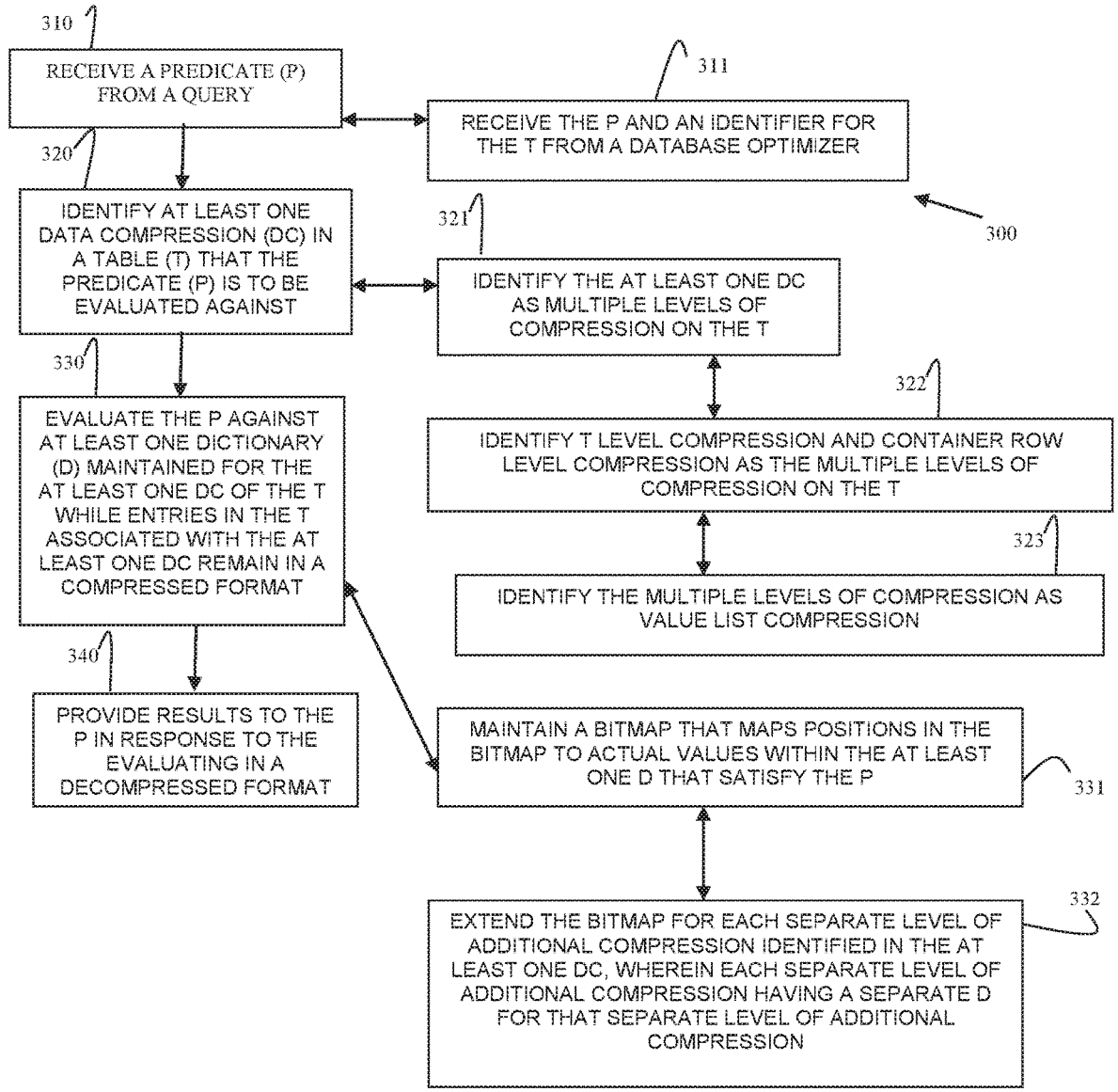
FIG. 3 is a diagram of another method for VLC aware qualification processing, according to an example embodiment.

FIG. 3 is a diagram of another method 200 for VLC aware qualification processing, according to an example embodiment. The method 200 is implemented as one or more software modules referred to as a "VLC predicate evaluator". The VLC predicate evaluator is executable instructions that are programmed within memory or a non-transitory computer-readable medium and executed by one or more hardware processors. The VLC predicate evaluator has access to one or more network connections during processing, which can be wired, wireless, or a combination of wired and wireless.

The VLC predicate evaluator presents another and in some ways enhanced perspective of the processing discussed above with the FIGS. 1 and 2.

In an embodiment, the VLC predicate evaluator is all or some combination of: the optimizer 102, the AMPS 103, and/or the method 200.

At 310, the VLC predicate evaluator receives a predicate from a query.

In an embodiment, at 311, the VLC predicate evaluator receives the predicate and an identifier for the table from a database optimizer.

At 320, the VLC predicate evaluator identifies at least one data compression in the table that the predicate is to be evaluated against.

According to an embodiment, at 321, the VLC predicate evaluator identifies the at least one compression as multiple levels of compression on the table.

In an embodiment of 321 and at 322, the VLC predicate evaluator identifies table level compression and container row level compression as the multiple levels of compression on the table.

In an embodiment of 322 and at 323, the VLC predicate evaluator identifies the multiple levels of compression as VLC.

At 330, the VLC predicate evaluator evaluates the predicate against at least one dictionary maintained for the at least one data compression of the table while entries in the table associated with the at least one data compression remain in the compressed format.

In an embodiment, at 331, the VLC predicate evaluator maintains a bitmap that maps positions in the bitmap to actual values within the at least one dictionary that satisfies the predicate.

In an embodiment of 331 and at 332, the VLC predicate evaluator extend the bitmap for each separate level of additional compression identified in the at least one data compression. Each separate level of additional compression has a separate dictionary.

At 340, the VLC predicate evaluator provides results to the predicate in response to the evaluating at 330 in a decompressed data format.

Figure 4:
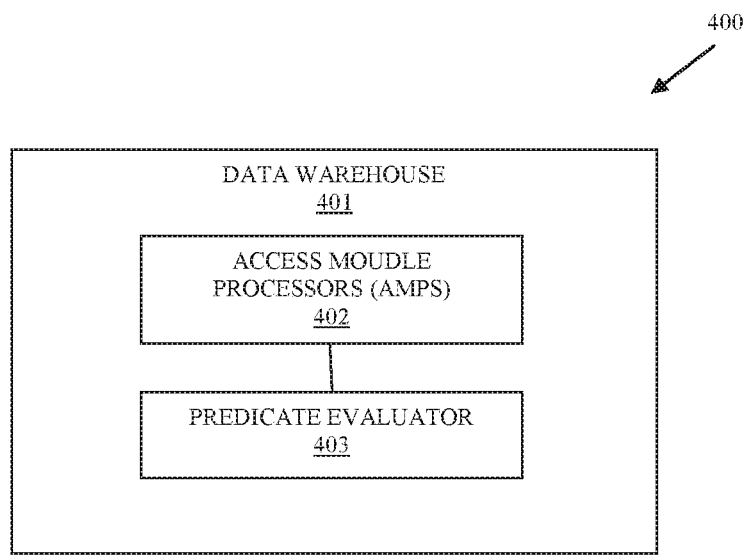
FIG. 4 is a diagram of another system for performing VLC aware qualification processing, according to an example embodiment.

FIG. 4 is a diagram of another system 400 for performing VLC aware qualification processing within a database. The system 400 includes a variety of hardware components and software components. The software components are programmed as executable instructions into memory or a non-transitory computer-readable medium for execution on the hardware components.

The system 400 implements, inter alia, the processing discussed above with the FIGS. 1-3.

The system 400 includes a data warehouse 401. The data warehouse 401 includes at least one AMP 402 distributed on a node (computing device) of a network. The AMP 402 includes a VLC aware predicate evaluator 403

The VLC aware predicate evaluator 403 is configured to: i) execute on a hardware processor of a network computing device, ii) evaluate a predicate of a query issued to the data warehouse 401 against at least one dictionary for a compressed table that the predicate is to be processed against while the compressed table remains in a compressed format, and iii) return results from evaluation of the predicate in a decompressed format that is decompressed from the compressed table.

In an embodiment, the VLC aware predicate evaluator 403 is further configured to provide the results to a query processor for processing further portions of the query that is separate from the predicate.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled

The invention claimed is:

1. A method, comprising:
    identifying a predicate of a query against a table that includes compressed data values and
    identifying the table as using Value List Compression for the compressed data values;
    obtaining a dictionary having actual values for the compressed data values, each of the actual values including an index to corresponding entries within the table having the compressed data values;
    evaluating the predicate of the query against the actual values in the dictionary and establishing a bitmap that identifies the actual values in the dictionary that are qualified and unqualified, wherein columns associated with the query that are unnecessary for evaluating the predicate of the query remain compressed;

identifying one or more of the entries within the table by processing the bitmap and the index to the corresponding entries within the table for the actual values that are qualified; and processing the query and returning the one or more of the entries as results for the query including the actual values and the compressed data values in a decompressed format.

2. The method of claim 1, wherein obtaining further includes obtaining the dictionary as a table header dictionary maintained for Value List Compression at a table level of detail for the compressed data values.

3. The method of claim 2, wherein obtaining further includes obtaining a second dictionary as a static dictionary maintained for compression of container rows of the table.

4. The method of claim 3, wherein obtaining further includes obtaining a third dictionary as a dynamic dictionary maintained for compression of the container rows of the table.

5. The method of claim 1, wherein evaluating further includes maintaining the compressed data values in a compressed format while evaluating the predicate of the query.

6. The method of claim 1, wherein evaluating further includes selectively processing an existing predicate evaluation process against those portions of the table that need evaluated for the predicate of the query when those portions of the table are natively decompressed within the table.

7. The method of claim 1, wherein evaluating further includes maintaining the bitmap as a string with each position in the string mapping to a specific one of the actual values present in the dictionary as the index to those actual values.

8. The method of claim 7, wherein maintaining further includes setting each bit within the string that matches the predicate of the query as an indication of one of the actual values that is qualified.

9. The method of claim 8, wherein setting further includes unsetting each bit within the string that does not match the predicate of the query as a second indication of one of the actual values that is unqualified.

10. The method of claim 1 further comprising, providing the actual values and the compressed data values in the decompressed format to a query process that continues to process other portions of the query with the actual values and the compressed data values in the decompressed format.

11. A method, comprising:

receiving a query;

identifying at least one compressed data value in a table that a predicate of the query is to be evaluated against and identifying the table as using Value List Compression for the compressed data value;

evaluating the predicate of the query against at least one actual value in a dictionary maintained for the at least one compressed data value in the table, wherein the at least one actual value in the dictionary is in a decompressed format, while entries in the table associated with the at least one compressed data value remain in a compressed format; and providing results to the query in response to evaluating the predicate of the query and processing of the query, the results including the at least one actual value and the at least one compressed data value in the decompressed format.

12. The method of claim 11, wherein receiving further includes receiving the query and an identifier for the table from a database optimizer.

13. The method of claim 11, wherein identifying further includes identifying multiple levels of compression on the table.

14. The method of claim 13, wherein identifying further includes identifying table level compression and container row level compression as the multiple levels of compression on the table.

15. The method of claim 14, wherein identifying further includes identifying the multiple levels of compression as Value List Compression.

16. The method of claim 11, wherein evaluating further includes maintaining a bitmap that maps positions in the bitmap to actual values within the at least one dictionary that satisfy the predicate of the query.

17. The method of claim 11, wherein evaluating further includes extending the bitmap for each separate level of additional compression identified in the table, wherein each separate level of additional compression having a separate dictionary for that separate level of additional compression.

18. A system, comprising:

one or more network computing devices; and a data warehouse implemented by the network computing devices including:

an access module processor implemented by the network computing devices and configured to process a Value List Compression (VLC) aware predicate evaluator, wherein the VLC aware predicate evaluator is configured to:

i) execute on a hardware processor of one of the network computing devices, ii) evaluate a predicate of a query issued to the data warehouse against actual values in at least one dictionary for a compressed table that the query is to be processed against while data values in the compressed table remain in a compressed format and the compressed table uses the Value List Compression for the data values; and iii) return results from processing of the query, wherein the results are in a decompressed format that are the actual values from the dictionary and the data values from the compressed table in the decompressed format.

19. The system of claim 18, wherein the VLC aware predicate evaluator is further configured to: iv) provide the results to a query processor for processing further portions of the query.

* * * * *